(12) United States Patent
Pierrottet et al.

(10) Patent No.: US 8,897,654 B1
(45) Date of Patent: Nov. 25, 2014

(54) SYSTEM AND METHOD FOR GENERATING A FREQUENCY MODULATED LINEAR LASER WAVEFORM

(75) Inventors: Diego F. Pierrottet, Poquoson, VA (US); Larry B. Petway, Hampton, VA (US); Farzin Amzajerdian, Yorktown, VA (US); Bruce W. Barnes, Yorktown, VA (US); George E. Lockard, Newport News, VA (US); Glenn D. Hines, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 232 days.

(21) Appl. No.: 13/527,638

(22) Filed: Jun. 20, 2012

(51) Int. Cl.
*H04B 10/00* (2013.01)

(52) U.S. Cl.
USPC ............................ 398/199; 398/183; 398/193

(58) Field of Classification Search
CPC .................................... H04B 10/548–10/5563
USPC ................................................ 398/182–201
See application file for complete search history.

(56) References Cited

U.S. PATENT DOCUMENTS

| | | | | |
|---|---|---|---|---|
| 4,611,912 A * | 9/1986 | Falk et al. ..................... 356/5.09 |
| 4,856,010 A * | 8/1989 | Wissman et al. ............... 372/32 |
| 5,289,252 A * | 2/1994 | Nourrcier ..................... 356/5.09 |
| 5,347,357 A * | 9/1994 | Nourrcier, Jr. ............... 356/5.09 |
| 5,534,993 A * | 7/1996 | Ball et al. ..................... 356/5.09 |
| 5,850,303 A * | 12/1998 | Yamamoto et al. ............. 398/91 |
| 5,923,280 A * | 7/1999 | Farmer .......................... 342/70 |
| 6,072,615 A * | 6/2000 | Mamyshev ................... 398/185 |
| 6,115,162 A * | 9/2000 | Graves et al. ................. 398/116 |
| 6,459,519 B1 * | 10/2002 | Sasai et al. ..................... 398/183 |
| 6,643,046 B2 * | 11/2003 | Ibe et al. ....................... 359/238 |
| 6,654,401 B2 * | 11/2003 | Cavalheiro Vieira et al. .. 372/70 |
| 6,778,279 B2 * | 8/2004 | Lange et al. ................... 356/483 |
| 6,844,924 B2 * | 1/2005 | Ruff et al. .................... 356/5.09 |
| 6,850,713 B2 * | 2/2005 | Kikuchi et al. ............... 398/201 |
| 6,889,008 B2 * | 5/2005 | Ogusu ............................ 398/91 |
| 6,950,222 B2 * | 9/2005 | Ibe et al. ....................... 359/279 |
| 6,970,655 B2 * | 11/2005 | Ono et al. ..................... 398/186 |
| 7,148,469 B2 * | 12/2006 | Pearson .................... 250/227.12 |
| 7,379,671 B2 * | 5/2008 | Shimomura et al. ............ 398/92 |
| 7,527,200 B2 * | 5/2009 | Tsikos et al. .................. 235/454 |
| 7,634,201 B2 * | 12/2009 | Maleki et al. ................. 398/202 |

(Continued)

OTHER PUBLICATIONS

Christer J. Karlsson, et al., "Linearization of the frequency-modulated continuous-wave semiconductor laser radar and the resulting ranging perfomance," Applied Optics, May 20, 1999, pp. 3376-3386, vol. 38, No. 15.

(Continued)

*Primary Examiner* — Agustin Bello
(74) *Attorney, Agent, or Firm* — Andrea Z. Warmbier

(57) ABSTRACT

A system for generating a frequency modulated linear laser waveform includes a single frequency laser generator to produce a laser output signal. An electro-optical modulator modulates the frequency of the laser output signal to define a linear triangular waveform. An optical circulator passes the linear triangular waveform to a band-pass optical filter to filter out harmonic frequencies created in the waveform during modulation of the laser output signal, to define a pure filtered modulated waveform having a very narrow bandwidth. The optical circulator receives the pure filtered modulated laser waveform and transmits the modulated laser waveform to a target.

11 Claims, 2 Drawing Sheets

(56) References Cited

U.S. PATENT DOCUMENTS

| | | | |
|---|---|---|---|
| 7,813,651 B2* | 10/2010 | Ilchenko et al. | 398/183 |
| 7,894,725 B2* | 2/2011 | Holman et al. | 398/201 |
| 7,954,719 B2* | 6/2011 | Zhu et al. | 235/462.42 |
| 7,974,534 B2* | 7/2011 | Weiner et al. | 398/85 |
| 8,525,974 B2* | 9/2013 | Turner et al. | 356/4.01 |
| 2003/0002121 A1* | 1/2003 | Miyamoto et al. | 359/183 |
| 2003/0030875 A1* | 2/2003 | Barczyk | 359/182 |
| 2003/0058519 A1* | 3/2003 | Ibe et al. | 359/279 |
| 2005/0012978 A1* | 1/2005 | Ibe et al. | 359/279 |
| 2007/0206190 A1* | 9/2007 | Baillon et al. | 356/342 |
| 2010/0266275 A1* | 10/2010 | Xia et al. | 398/16 |
| 2013/0243430 A1* | 9/2013 | Hironishi et al. | 398/48 |
| 2014/0036252 A1* | 2/2014 | Amzajerdian et al. | 356/28 |

OTHER PUBLICATIONS

Farzin Amzajerdian, et al., "Coherent Doppler Lidar for Precision Navigation of Spacecrafts," 16th Coherent Laser Radar Conference, Jun. 20-24, 2011, pp. 1-4, Long Beach, CA.

Farzin Amzajerdian, et al., "Coherent Doppler Lidar for Precision Navigation of Spacecrafts," 16th Coherent Laser Radar Conference, Presentation, Jun. 20-24, 2011, pp. 1-25, Long Beach, CA.

* cited by examiner

US 8,897,654 B1

SYSTEM AND METHOD FOR GENERATING A FREQUENCY MODULATED LINEAR LASER WAVEFORM

STATEMENT REGARDING FEDERALLY SPONSORED RESEARCH OR DEVELOPMENT

The invention described herein was made in part by employees of the United States Government and may be manufactured and used by or for the Government for governmental purposes without payment of any royalties thereon or therefore.

TECHNICAL FIELD

The invention generally relates to a system and a method of generating a frequency modulated linear laser waveform.

BACKGROUND OF THE INVENTION

Frequency modulation of a single frequency laser with a linear triangular waveform is of great importance to many laser remote sensing and interferometry applications. An application of a linear frequency modulation may include a laser radar (e.g. light detection and ranging (LIDAR)) system for target ranging and three-dimensional profiling of surfaces. Linear frequency modulation of a continuous wave laser beam may enable such a LIDAR system to make precise target distance measurements. However, the frequency modulation must be nearly perfectly linear with time to provide high resolution and accuracy.

SUMMARY OF THE INVENTION

A system for generating a frequency modulated laser waveform is provided. The system includes a laser that is configured for producing a laser output signal. The laser output signal includes a single frequency and a linewidth centered at $\omega_o$. An electro-optical modulator is coupled to the laser. The electro-optical modulator receives the laser output signal from the laser. An electric ramp generator is coupled to the electro-optical modulator. The electric ramp generator generates a ramp having a frequency chirp with a bandwidth B over a time period T, and a modulation offset frequency $\omega_m$. The ramp controls the electro-optical modulator to modulate the laser output signal to define a modulated waveform. A band-pass optical filter is coupled to the electro-optical modulator. The band-pass optical filter receives the modulated waveform and filters out harmonic frequencies created by the electro-optical modulate during modulation of the laser output signal. The band-pass optical filter includes a bandwidth BW that is greater than the modulation bandwidth B and less than the modulation offset frequency $\omega_m$, and is centered at the frequency of the laser output signal $\omega_o$ plus the modulation offset frequency $\omega_m$.

A frequency modulated laser waveform generating system is also provided. The frequency modulated laser waveform generating system includes a single frequency laser that produces a laser output signal. The laser output signal includes a single frequency having a narrow linewidth defining a sine wave centered at $\omega_o$. An electro-optical modulator is coupled to the laser and receives the laser output signal from the laser. An electric ramp generator is coupled to the electro-optical modulator. The electric ramp generator generates a linear ramp having a frequency chirp with a bandwidth B between the range of 300 MHz and 3.0 GHz over a time period T between the range of 0.01 msec and 0.20 msec, a modulation offset frequency $\omega_m$ between the range of 5.0 GHz and 30 GHz, and a deviation less than or equal to 71 Khz. The linear ramp controls the electro-optical modulator to modulate the laser output signal to define a modulated waveform. A band-pass optical filter is coupled to the electro-optical modulator. The band-pass optical filter receives the modulated waveform and filters out harmonic frequencies created by the electro-optical modulator during modulation of the laser output signal to define a pure filtered modulated waveform. The band-pass optical filter includes a bandwidth BW that is greater than the modulation bandwidth B and less than the modulation offset frequency $\omega_m$, and is centered at the frequency of the laser output signal $\omega_o$ plus the modulation offset frequency $\omega_m$. An optical circulator interconnects the electric ramp generator and the band-pass optical filter. The optical circulator includes an input that receives the modulated waveform from the electric ramp generator, an output/input that sends and receives the modulated waveform to and from the band-pass optical filter, and an output leg that transmits the pure filtered modulated waveform.

A method of generating a laser frequency modulated waveform is also provided. The method includes generating a laser output signal having an ultra narrow linewidth defining a sine wave. A linear ramp having a frequency chirp with a bandwidth B over a time period T, and a modulation offset frequency $\omega_m$ is generated. The laser output signal from the single frequency laser is modulated with an electro-optical modulator driven by the linear ramp to define a modulated waveform. The modulated waveform from the electro-optical modulator is filtered with a band-pass optical filter to remove harmonic frequencies in the modulated waveform created by the electro-optical modulator during modulation of the laser output signal. The band-pass optical filter produces a pure filtered modulated waveform.

Accordingly, the output from the frequency modulated laser waveform generating system is a pure linear triangular frequency modulated waveform that is suitable for use in remote laser sensing applications, such as a LIDAR system, as well as other applications that may require a highly linear frequency modulated laser beam.

DETAILED DESCRIPTION OF THE INVENTION

Figure 1:
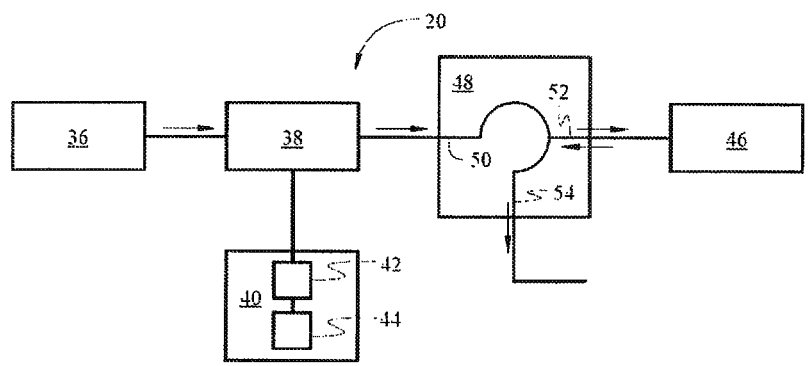
FIG. 1 is a schematic diagram of a system for generating a frequency modulated laser waveform.
Figure 2:
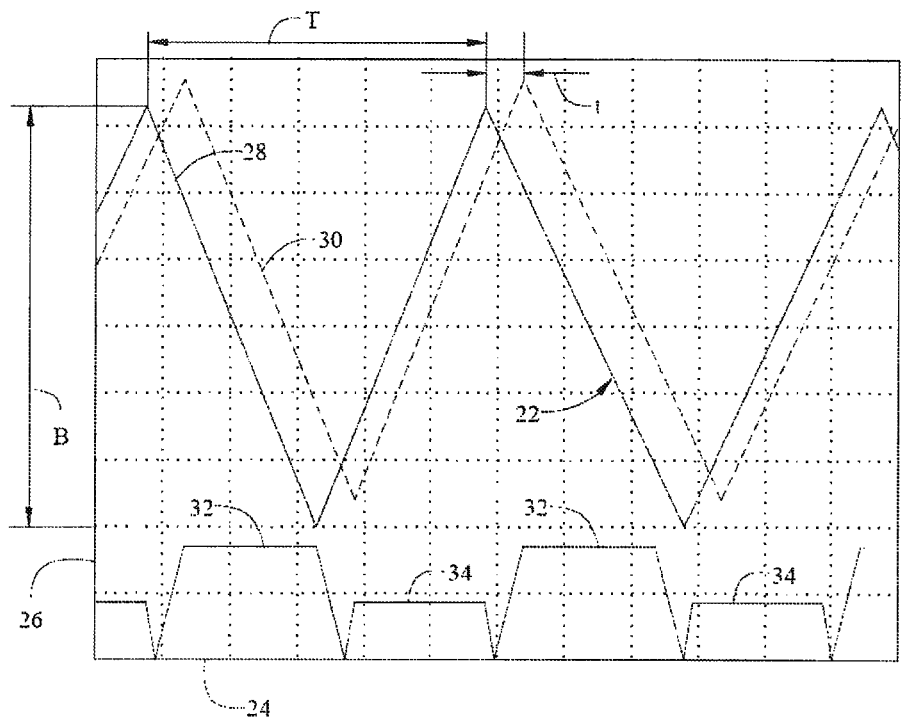
FIG. 2 is a graph of a linear triangular frequency modulated waveform of a laser beam.

Referring to the Figures, wherein like numerals indicate like parts throughout the several views, laser generating system is generally shown at 20 in FIG. 1. Referring to FIG. 2, the laser generating system 20 produces a frequency modulated linear laser waveform generally shown at 22. Within FIG. 2, time is shown along a horizontal axis 24, and the frequency of the modulated linear waveform is shown along a vertical axis 26. The modulated linear waveform produced by the laser generating system 20 and shown in FIG. 2 is suitable for use in, but is not limited to, a laser radar (e.g. LIDAR) system for target ranging and three-dimensional profiling of surfaces. As shown in FIG. 2, the modulated linear waveform includes and/or defines a triangular or sawtooth shape. The modulated linear waveform is shown being transmitted at 28, and is shown being received at 30 upon reflection off of a target. The modulated linear waveform is delayed between transmission and receipt by a light round trip time (t). The delay between the received modulated linear waveform and the transmitted modulated linear waveform causes the received modulated linear waveform to mix with the transmitted modulated linear waveform, thereby generating an interference signal. The frequency of the interference signal is equal to the difference between frequency of the transmitted modulated linear waveform and the frequency of the received modulated linear waveform. The frequency of the interference signal is directly proportional to a distance to the target. The frequency of the interference signal shifts due to the Doppler effect when the target and/or the laser generating system 20 moves relative to the other during time t. The relative velocity between the laser generating system 20 and the target may be determined by the frequency of the interference signal during "up chirp" periods, generally indicated at 32, and during "down chirp" periods, generally indicated at 34. In order for this targeting technique to work accurately, the frequency modulated laser waveform must be highly linear.

Figure 3:
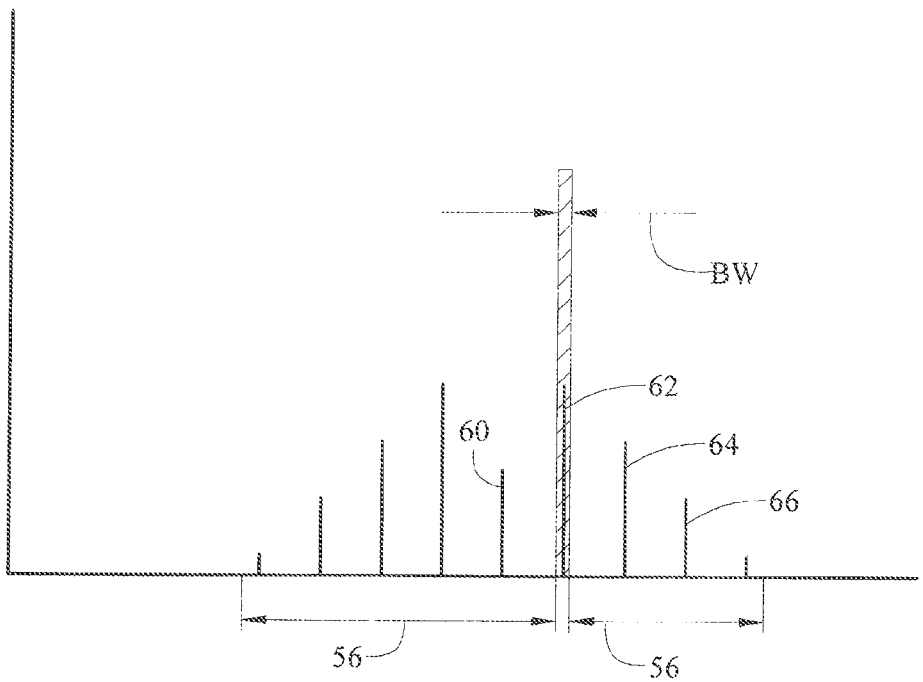
FIG. 3 is graph showing bandwidth over which the linear triangular frequency modulated waveform is filtered and the harmonic frequencies filtered out of the linear triangular frequency modulated waveform.

Referring to FIGS. 1 and 3, the laser generating system 20 includes a single output frequency laser 36 that produces a laser output signal having a single frequency. The laser output signal includes a very pure spectrum with an ultra-narrow linewidth. The linewidth of the laser output signal is close to a perfect sine wave, and is centered at $\omega_o$, shown at 60 in FIG. 3. The laser output signal $\omega_o$ 60 is unmodulated.

An electro-optical modulator 38 is coupled to the single output frequency laser 36. The electro-optical modulator 38 receives the laser output signal from the single output frequency laser 36, and modulates the frequency of the laser output signal. The electro-optical modulator 38 includes an electro-optical crystal that changes properties of the laser output signal when an electric field is applied.

An electric ramp generator 40 is coupled to the electro-optical modulator 38 and drives the electro-optical modulator 38 with a pre-defined modulation waveform to define a modulated waveform. For example, the electric ramp generator 40 may drive the electro-optical modulator 38 with a linear frequency modulation waveform. However, it should be appreciated that the pre-defined modulation waveform may differ from the linear frequency modulation waveform described herein. The electric ramp generator 40 includes a voltage controlled oscillator 42 controlled by a digital micro-controller 44. The digital micro-controller 44 generates a pre-defined ramp, which is provided to the voltage controlled oscillator 42 to create the pre-defined modulation waveform. For example, the digital micro-controller 44 may generate a nearly perfect linear ramp to create the linear frequency modulation waveform.

The electric ramp generator 40 controls the electro-optical modulator 38 to modulate the laser output signal to define the modulated waveform. The linear ramp output from the digital micro-controller 44 includes a deviation from a perfect ramp that is less than or equal to 71 Khz, or less than 0.001%. The linear ramp includes a frequency chirp with a bandwidth B over a time period T, and a modulation offset frequency $\omega_m$ that is offset from Direct Current, i.e., $\omega_o$ 60. Preferably, the modulation offset frequency $\omega_{in}$ of the linear ramp is between the range of 5 GHz and 30 GHz, and more preferably is equal to 6.0 GHz, and the bandwidth B of the linear ramp is preferably between the range of 300 MHz and 3.0 GHz, and is more preferably equal to 600 MHz over a time period T between the range of 0.01 msec and 0.20 msec, and more preferably equal to 0.15 msec. However, it should be appreciated that the values of the modulation offset frequency $\omega_m$, the bandwidth B of the linear ramp, and the time period T may differ from the preferred values described above. As shown in FIG. 3, the modulated waveform includes a first order sideband 62, a second order sideband 64, a third order sideband 66, etc.

A band-pass optical filter 46 is coupled to the electro-optical modulator 38. An optical circulator 48 interconnects the electric ramp generator 40 and the band-pass optical filter 46. The optical circulator 48 includes an input leg 50 that receives the modulated waveform from the electric ramp generator 40, an output/input 52 that sends the modulated waveform to the band-pass optical filter 46 and receives the reflected modulated waveform from the band-pass optical filter 46, and an output leg 54 that transmits the pure filtered modulated waveform returned from the band-pass optical filter 46 to the target.

The very narrow band-pass optical filter 46 receives the modulated waveform and filters out other harmonic frequencies created by the electro-optical modulator 38 during modulation of the laser output signal. The harmonic frequencies are generally shown in the regions labeled by reference numeral 56. The band-pass optical filter 46 may include but is not limited to a fiber optic-based reflective filter that reflects the pure filtered modulated waveform back to the optical circulator 48, whereupon the optical circulator 48 directs the pure filtered modulated waveform to the output leg 54 of the optical circulator 48. The band-pass optical filter 46 includes a bandwidth BW that is greater than the bandwidth B of the linear ramp and less than the modulation offset frequency $\omega_m$. The bandwidth BW of the band-pass optical filter 46 is centered at the frequency of the laser output signal $\omega_o$ plus the modulation offset frequency $\omega_m$, i.e., ($\omega_o+\omega_m$). The band-pass optical filter 46 removes the harmonic frequencies, i.e., filters the harmonic frequencies (generally indicated by regions 56) that are outside of the bandwidth BW of the band-pass optical filter 46. Therefore, the modulated waveform output from the optical circulator 48 includes a pure linear frequency modulated waveform suited for transmission to the target.

As shown in FIG. 3, the band-pass optical filter 46 is centered at the first order sideband 62 at $\omega_w+\omega_m$, away from Direct Current, i.e., $\omega_o$ 60. However, the band-pass optical filter 46 may alternatively be positioned at the second order sideband 64, the third order sideband 66, or some other higher order sideband. Positioning the band-pass optical filter 46 at a higher order sideband, i.e., the second order sideband 64 or higher, multiplies the modulation bandwidth B. For example, if the modulation bandwidth B is equal to 600 MHz when the band-pass optical filter 46 is centered at the first order sideband 62, then the modulation bandwidth B will equal 1200 MHz when the band-pass optical filter 46 is centered at the second order sideband 64, and will equal 1800 MHz when centered at the third order sideband 66. This allows for bandwidth multiplication of the linear ramp just by selecting the position of the band-pass optical filter 46 on the desired sideband.

A method of generating frequency modulated laser waveform is also provided. The method includes generating the laser output signal. The laser output signal is generated from the single output frequency laser 36 described above. As noted above, the laser output signal includes an ultra narrow linewidth defining a nearly perfect sine wave.

A pure linear ramp is generated with an electric ramp generator 40. The linear ramp is used to drive the electro-optical modulator 38 to modulate the frequency of the laser output signal. The linear ramp includes a frequency chirp with a bandwidth B over a time period T, and a modulation offset frequency $\omega_m$. As noted above, the modulation offset frequency $\omega_m$ of the linear ramp is preferably between the range of 5 GHz and 30 GHz, the bandwidth B of the linear ramp is preferably between the range of 300 MHz and 3.0 GHz over a time period T between the range of 0.01 msec and 0.20 msec, and the linear ramp may include a deviation from a perfect ramp of less than or equal to 71 Khz, or less than 0.001%.

The laser output signal from the single output frequency laser 36 is modulated with the electro-optical modulator 38 to define the modulated waveform. As described above, the modulated waveform preferably includes linear triangular modulated waveform. The modulated waveform is then transmitted from the electro-optical modulator 38 to the band-pass optical filter 46 through an optical circulator 48.

The modulated waveform from the electro-optical modulator 38 is filtered with the band-pass optical filter 46 to remove harmonic frequencies in the modulated waveform that are created by the electro-optical modulator 38 during modulation of the laser output signal. Filtering out the harmonic frequencies from the modulated waveform produces a pure filtered modulated waveform. The pure filtered modulated waveform is reflected from the band-pass optical filter 46 back to the optical circulator 48; whereupon the optical circulator 48 may transmit the pure filtered modulated waveform to the target.

While some embodiments of the invention have been herein illustrated, shown and described, it is to be appreciated that various changes, rearrangements and modifications may be made therein, without departing from the scope of the invention as defined by the appended claims. It is intended that the specific embodiments and configurations are disclosed for practicing the invention, and should not be interpreted as limitations on the scope of the invention as defined by the appended claims and it is to be appreciated that various changes, rearrangements and modifications may be made therein, without departing from the scope of the invention as defined by the appended claims.

The invention claimed is:

1. A system for generating a frequency modulated laser waveform, the system comprising:
    a laser capable of producing a laser output signal having a single frequency and a linewidth centered at $\omega_o$;
    an electro-optical modulator coupled to the laser and configured for receiving the laser output signal from the laser;
    an electric ramp generator comprising a voltage controlled oscillator controlled by a digital micro-controller that is capable of generating a linear ramp, wherein the electric ramp generator is coupled to the electro-optical modulator and capable of generating a ramp having a frequency chirp with a bandwidth B over a time period T, and a modulation offset frequency $\omega_m$ for controlling the electro-optical modulator to modulate the laser output signal to define a modulated waveform, wherein the linear ramp includes a deviation less than or equal to 71 Khz; and
    a band-pass optical filter coupled to the electro-optical modulator and capable of receiving the modulated waveform and for filtering out harmonic frequencies created by the electro-optical modulator during modulation of the laser output signal;
    wherein the band-pass optical filter includes a bandwidth BW greater than the modulation bandwidth B and less than the modulation offset frequency $\omega_m$, and is centered at the frequency of the laser output signal $\omega_o$ plus the modulation offset frequency $\omega_m$; and
    wherein the modulation offset frequency $\omega_m$ of the linear ramp is between the range of 5.0 GHz and 30 GHz, and the bandwidth B of the linear ramp is between the range of 300 MHz and 3.0 GHz over a time period T between the range of 0.01 msec and 0.20 msec.

2. The system as set forth in claim 1, further including an optical circulator interconnecting the electric ramp generator and the band-pass optical filter and having an input leg configured for receiving the modulated waveform from the electric ramp generator, an output/input configured for sending and receiving the modulated waveform to and from the band-pass optical filter, and an output leg configured for transmitting the pure filtered modulated waveform.

3. The system as set forth in claim 1, wherein the laser includes a single output frequency laser.

4. The system as set forth in claim 3, wherein the linewidth frequency of the laser output signal includes a sine wave.

5. The system as set forth in claim 1, wherein the electro-optical modulator includes an electro-optical crystal configured to change properties of the laser output signal with an electric field.

6. The system as set forth in claim 1, wherein the band-pass optical filter includes a fiber optic-based reflective filter.

7. A frequency modulated laser waveform generating system comprising:
    a single frequency laser configured for producing a laser output signal having a single frequency having a narrow linewidth defining a sine wave centered at $\omega_o$;
    an electro-optical modulator coupled to the laser and configured for receiving the laser output signal from the laser;
    an electric ramp generator coupled to the electro-optical modulator and configured for generating a linear ramp having a frequency chirp with a bandwidth B between the range of 300 MHz and 3.0 GHz over a time period T between the range of 0.01 msec and 0.20 msec, a modulation offset frequency $\omega_m$ between the range of 5.0 GHz and 30 GHz, and a deviation less than or equal to 71 Khz, wherein the linear ramp is configured for controlling the electro-optical modulator to modulate the laser output signal to define a modulated waveform; and
    a band-pass optical filter coupled to the electro-optical modulator and configured for receiving the modulated waveform and for filtering out harmonic frequencies created by the electro-optical modulator during modulation of the laser output signal to define a pure filtered modulated waveform; and
    an optical circulator interconnecting the electric ramp generator and the band-pass optical filter and having an input configured for receiving the modulated waveform from the electric ramp generator, an output/input configured for sending and receiving the modulated waveform to and from the band-pass optical filter, and an output leg configured for transmitting the pure filtered modulated waveform;
    wherein the band-pass optical filter includes a bandwidth BW greater than the modulation bandwidth B and less than the modulation offset frequency $\omega_m$, and is centered at the frequency of the laser output signal $\omega_o$ plus the modulation offset frequency $\omega_m$.

8. A method of generating a laser frequency modulated waveform, the method comprising:
    generating a laser output signal having an ultra narrow linewidth defining a sine wave;

generating a linear ramp having a frequency chirp with a bandwidth B over a time period T, and a modulation offset frequency $\omega_m$, wherein the linear ramp includes a deviation less than or equal to 71 Khz;

modulating the laser output signal from the single frequency laser with an electro-optical modulator driven by the linear ramp to define a linear triangular modulated waveform; and filtering the linear triangular modulated waveform from the electro-optical modulator with a band-pass optical filter to remove harmonic frequencies in the linear triangular modulated waveform created by the electro-optical modulator during modulation of the laser output signal to produce a pure filtered modulated waveform;

wherein the band-pass optical filter includes a bandwidth BW greater than the modulation bandwidth B and less than the modulation offset frequency $\omega_m$, and is centered at a frequency of the laser output signal $\omega_o$ plus the modulation offset frequency $\omega_m$; and wherein the modulation offset frequency a of the linear ramp is between the range of 5.0 GHz and 30 GHz, and the bandwidth B of the linear ramp is between the rang of 300 MHz and 3.0 GHz over a period T between the range of 0.01 msec and 0.20 msec.

9. The method as set forth in claim 8, further comprising transmitting the modulated waveform from the electro-optical modulator to the band-pass optical filter through an optical circulator.

10. The method as set forth in claim 9, further comprising reflecting the pure filtered modulated waveform from the band-pass optical filter back to the optical circulator.

11. The method as set forth in claim 10, further comprising transmitting the pure filtered modulated waveform from the optical circulator to a target.

* * * * *